United States Patent [19]

Hennessey

[11] Patent Number: 4,760,984

[45] Date of Patent: Aug. 2, 1988

[54] QUICK DISCONNECT ASSEMBLY FOR MICROPHONE

[76] Inventor: James R. Hennessey, 7 Sunrise Hill Dr., West Hartford, Conn. 06107

[21] Appl. No.: 31,248

[22] Filed: Mar. 26, 1987

[51] Int. Cl.⁴ .............................................. F16L 3/00
[52] U.S. Cl. ................................... 248/121; 248/408; 403/319; 403/324
[58] Field of Search ............ 248/121, 122, 125, 406.1, 248/407, 408, 409; 403/319, 324, 327, 359

[56] References Cited

U.S. PATENT DOCUMENTS

| | | | |
|---|---|---|---|
| 2,776,462 | 1/1957 | Burroughs | 248/122 X |
| 3,102,638 | 9/1963 | Saunders | 248/121 X |
| 3,443,784 | 5/1969 | Walkinshaw | 248/408 |
| 4,047,684 | 9/1977 | Kobayashi | 248/122 |
| 4,113,221 | 9/1978 | Wehner | 248/408 |
| 4,261,668 | 4/1981 | Rigal | 403/319 |
| 4,339,104 | 7/1982 | Weidman | 248/407 |
| 4,473,317 | 9/1984 | Bolang | 403/359 |
| 4,645,368 | 2/1987 | Simpson et al. | 403/324 X |

Primary Examiner—Ramon O. Ramirez
Attorney, Agent, or Firm—Ira S. Dorman

[57] ABSTRACT

A quick-disconnect assembly for a microphone holder enables ready removal and secure repositioning for optimal angular orientation.

23 Claims, 1 Drawing Sheet

QUICK DISCONNECT ASSEMBLY FOR MICROPHONE

BACKROUND OF THE INVENTION

People who use microphones, such as singers and other performers, often like to remove them from their supporting stands for enhanced musical and/or dramatic effect. One style of microphone that is now widely used has a slender, generally cylindrical, slightly tapered body. To accommodate it, the supporting stand is fitted with a head assembly which includes a socket component with a channel that is tapered to seat the microphone body. The socket component is normally pivotably connected to a threaded stem, which is in turn tightened directly upon the upper end of the post of the stand.

Normally, the parts of such microphone-holding head assemblies are of plastic construction and are made in relatively thin sections, for the sake of good economy; consequently, however, it is not uncommon for them to become broken in normal use. This occurs primarily during transport of equipment because the plastic holders are generally left on the stand posts (due to the time and inconvenience involved in unscrewing them), and the stands are piled or stacked together, thereby subjecting the relatively fragile plastic components to impact and abuse from the heavier parts.

Also, because the pick-up components are located at the end of the body, this style of microphone is sometimes found to be somewhat awkward to hold. This is because the body itself is gripped, and there is no angularly extending handle that would enable support from below. Furthermore, the stand systems that are currently available do not readily permit changes to be made in the orientation of the microphone, in an angular sense with respect to the axis of the supporting post, with the new position being positively established and securely maintained.

Accordingly, it is the broad object of the present invention to provide a novel assembly, and a microphone-support system including it, which incorporates a unique quick-disconnect feature.

It is a more specific object of the invention to provide such an assembly which enables separation of the microphone holding unit from the supporting stand, and ready replacement thereof in any of a number of fixed, angular orientations with respect to the axis of the post.

Another specific object is to provide such an assembly wherein the removable holder unit includes a pivotably attached stem component, which can be adjusted to extend at an angle generally perpendicular to the axis of the channel through the socket component of the holder, so as to permit convenient hand-held support of the microphone from below.

Additional objects of the invention are to provide a quick-disconnect assembly having the foregoing features and advantages which is of relatively uncomplicated, inexpensive and yet durable construction, and which incorporates positive locking features for good positional control.

SUMMARY OF THE INVENTION

It has now been found that certain of the foregoing and related objects of the invention are readily attained by the provision of a novel assembly for use in a supporting system for a microphone or the like, which comprises a first part having retaining means thereon and an elongated portion projecting from one of its ends. The elongated portion has a regular, noncircular cross section in a plane perpendicular to its longitudinal axis, and is configured to provide a plurality of engagement elements extending generally longitudinally along its surface from its outer end. A second part of the assembly has a recess therein and engaging and locking means thereon, the recess being adapted to receive the projecting portion of the first part coaxially therewithin, and the engaging means being configured to interengage with the engagement elements in each of a plurality of relative angular positions of the projecting portion within the recess, to prevent relative rotation of the parts. The locking means provided is manually operable to releasably engage the retaining means of the first part, so as to retain it in assembly with the second part with the projecting portion within the recess thereof.

The engaging means of the second part will desirably comprise an inside surface defining its recess; the projecting portion of the first part may be a splined post comprised of rectilinear spline elements, with the recess-defining surface of the second part being configured to provide inwardly extending splines mated thereto. The projecting portion of the first part will preferably be indented at a location spaced from its outer end to provide the retaining means thereon, and the locking means will comprise a latch that is moveably mounted on the second part, the latch having an edge portion disposed to seat within the indentation of the projecting portion.

The indentation may comprise a circumferential groove and the latch may be of blade-like form and slidable along a plane transverse to the axis of the recess, thus enabling the edge portion to shift between a locking position within the recess and a release position displaced from it. More specifically, the latch may be mounted within a slot that is formed perpendicularly of the axis of the second part and is configured to constrain it to rectilinear shifting movement; the locking means may additionally include a push button that is operatively connected to the latch blade and is externally accessible on the second part for manual actuation, and means for biasing the latch to the locking position of its edge portion.

An elongated collar may provide the second part of the assembly, and it will advantageously be formed with a cross section that is of generally circular configuration but is asymmetrically enlarged to provide a generally right-angular corner formation, one face of which has a cavity in which the push button of the locking means is seated. The recess provided by such a collar will generally extend longitudinally from one end and a coaxial bore will extend inwardly from the opposite end, the bore having a threaded surface to permit engagement of the collar upon a supporting post. Similarly, the first part may be a coupling piece having means for attachment to a microphone holder, the attachment means conveniently comprising a threaded lug extending coaxially with the elongated portion and in the opposite direction.

Other objects of the invention are attained by the provision of a novel microphone-support system, which includes a microphone holder and a floor stand having, respectively, the above-described "first" and "second" parts thereon, disengageably assembled with one another. The stand will normally include a relatively heavy floor-engaging base with an upright post, the second part being removably mounted upon its upper end.

In the preferred embodiments of the system, the holder will include a sleeve member providing a generally rectilinear socket portion for seating an elongated microphone body. The first part will be joined to the sleeve member to extend generally perpendicularly therefrom, and it will normally be pivotably mounted for movement through an arc of about 180° with respect to and in the plane of the axis of the socket portion. The first part will desirably be separable from the sleeve member, and it may be a coupling piece having means thereon, such as a threaded lug, for attachment to another portion of the holder.

DETAILED DESCRIPTION OF THE ILLUSTRATED EMBODIMENT

Figure 2:
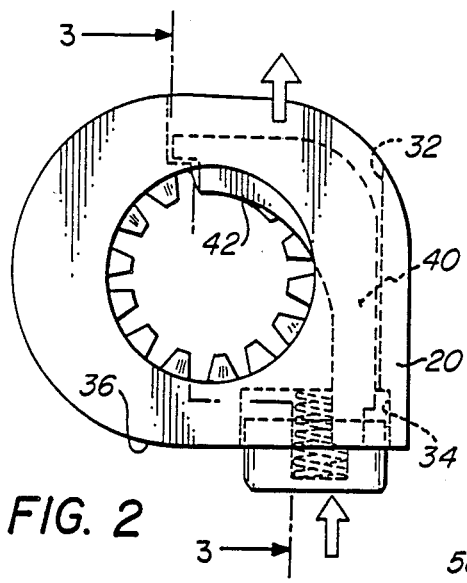
FIG. 2 is a plan view, drawn to an enlarged scale, showing the collar piece of the assembly.
Figure 1:
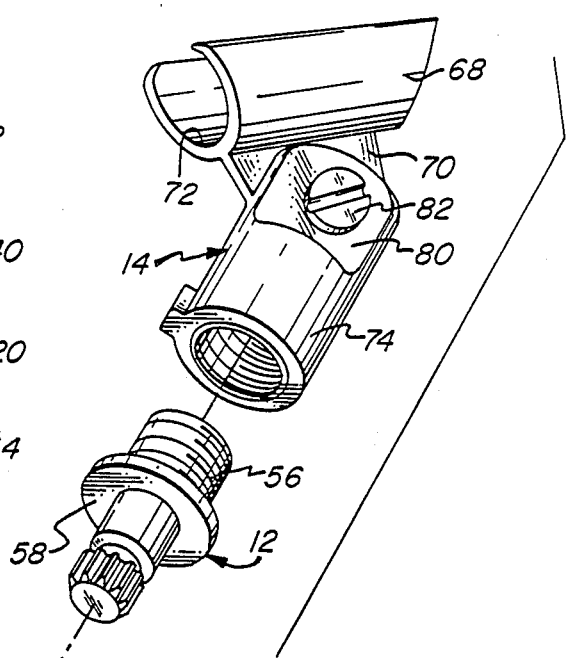
FIG. 1 is an exploded perspective view of a quick-disconnect assembly embodying the present invention, also showing the microphone-holder head assembly and (fragmentarily) a supporting stand employed therewith and cooperatively comprising a support system of the invention.

Turning now in detail to the appended drawing, therein illustrated is a microphone-support system and quick-disconnect assembly embodying the present invention, including a collar piece, generally designated by the numeral 10, and a coupling piece, generally designated by the numeral 12. The system additionally includes a microphone holder head assembly and a floor-engaging stand, generally designated respectively by the numerals 14 and 16.

The collar piece 10 has a generally cylindrical body 18 of molded plastic construction, which is asymmetrically enlarged in transverse cross-section to provide a generally right-angular corner formation 20. A circular recess 22 extends into the collar piece 10 from one end, and leads to a splined inner section 24 comprised of equidistantly spaced, axially extending rectilinear elements or teeth 26. A coaxial bore 28 extends into the collar piece 10 from the opposite end, and has affixed within it a threaded metal bushing 30. A thin slot 32 extends through the piece 10 in a plane prependicular to its longitudinal axis, and opens at one end into a shallow cavity 34 formed into one face 36 of the corner formation 20.

Figure 3:
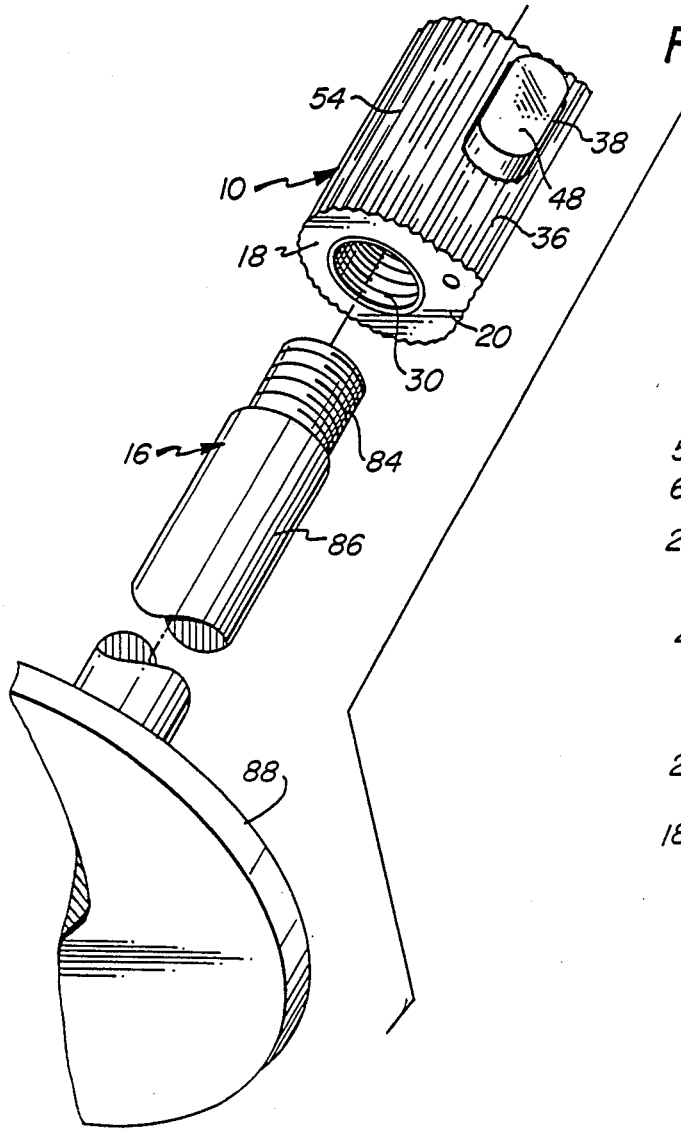
FIG. 3 is a fragmentary sectional view of the support system, taken generally along line 3—3 of FIG. 2 and drawn to a scale slightly diminished from the scale thereof.
Figure 3:
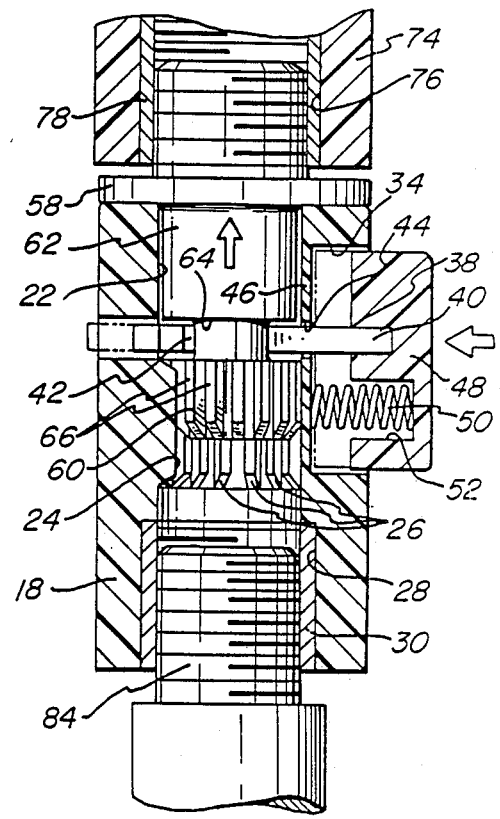

A locking member, or latch, is mounted within the collar piece 10 and includes an L-shaped blade, generally designated by the numeral 38, having a generally rectilinear tang portion 40 and an arcuate inner edge portion 42. The tang portion 40 extends through a small aperture 44 formed in the interior web element 46 of the body 18, which forms the inner wall of the cavity 34, and is secured to a push button 48, seated within the cavity. The slot 32 is configured to cooperate in constraining the blade 38 of the latch to rectilinear sliding movement, and a small coil spring 50 has one of its end portions seated within an internal recess 52 of the push button and its opposite end bearing upon the web element 46, to bias the locking member to a normally outward position (as shown in the Figures). In that condition the arcuate edge portion 42 of the blade resides within the circular recess 22, as best seen in FIGS. 2 and 3. The body 18 of the collar piece 10 has a corrugated exterior surface 54, providing good gripping advantage as well as an attractive appearance; the corner formation 20 also affords good gripping characteristics and provides a convenient location for the push button.

The coupling piece 12 consists of a threaded lug portion 56 and a coaxial post component, which extend in opposite directions and have annular abutment element 58 therebetween. The post component has a splined outer end portion 60 and a cylindrical inner portion 62, separated by a circumferential groove 64. The axially extending, rectilinear elements 66 of which the spline portion 60 is comprised match teeth 26 of section 24, and they cooperate therewith to permit axial insertion of the post component of the coupling piece 12 into the recess 22 of the collar piece 10 for interengagement against relative rotation in any of a multiplicity of angular relationships about their common, longitudinal axis.

In the inserted position shown in FIG. 3, the arcuate element 42 of the blade 38 of the latch is engaged within the circumferential groove 64 of the coupling piece post, and is held therewithin under the outward biasing force of the spring 50 acting upon the pushbutton 48; this of course serves to retain the pieces 10, 12 against axial disassembly. As will readily be appreciated, disengagement is quickly effected simply by depressing the push button 48 (in the direction of the arrows shown in FIGS. 2 and 3), thereby shifting the blade to displace the edge component 42 from within the groove 64, permitting withdrawal of the coupling piece 12.

The microphone holder head-assembly 14 will normally be of plastic construction, and includes a sleeve member consisting of a channel-defining portion 68 and a flange portion 70 extending along the bottom thereof. Although perhaps not immediately evident from the drawing, the channel 72 within the portion 68 is of slightly tapered, cylindrical form, as is standard for supporting a microphone having a similarly tapered elongated body. A stem component of the holder assembly consists of a cylindrical neck portion 74 having an inwardly extending circular recess 76 within which is affixed a threaded metal bushing 78, and a pair of parallel ears 80 (only one of which is visible) at the upper end thereof. The flange portion 70 of the sleeve member is seated between the ears 80, and the cooperating elements have apertures therein (not visible) through which the threaded fastener 82 extends to hold them in assembly. The fastener 82 is tightened sufficiently to permit relative pivotable movement of the components while maintaining them in any selected position, and movement through an arc of approximately 180° is possible.

The head assembly 14 of course joined with the coupling piece 12 by threaded interengagement of the lug portion 56 within the bushing 78. Similarly, the collar piece 10 is assembled with the stand 16 by engagement of the threaded upper end portion 84 of the post 86 within the bushing 30. A heavy floor-engaging base 88 is provided at the bottom of the post 86, in conventional fashion.

In addition to permitting the microphone holding head assembly to be readily removed from the stand, in the manner previously described, the quick-disconnect assembly enables the stem component of the holder assembly to function as an adjustable handle for holding the microphone from below. Moreover, because the head assembly can so readily be removed and replaced in any of a multiplicity of securely fixed angular relationships, simply by reinserting the post component of the coupling piece into the aperture of the collar piece in the desired orientation, the assembly of the invention affords great flexibility to the performer in selecting the most comfortable or desirable microphone position. Moreover, because the plastic parts are readily removed from the relatively massive components of which the stand is comprised, they can be stored and transported separately to protect them against the breakage that otherwise commonly occurs.

Although the spline structure illustrated represents one desirable way of providing the mated interengagement of the parts, other noncircular cross sections can of course be used instead. For example, the post component of the coupling piece may be made of oval cross section, in which form the structure at the ends of the major cross sectional axis may be regarded as providing the plurality of engagement elements required. Also, it will be appreciated that the assembly has use in applications other than for supporting a microphone holder. It may for example provide a nonrotatable connection between the base 88 and the post 86 of the stand illustrated; such use of the assembly will not only permit ready disconnection of the components, for facile storage and transport, but will also avoid the annoyance of loosening at the conventional threaded joint, as frequently occurs during normal positioning of a microphone or boom supported on the stand.

Thus, it can be seen that the present invention provided a novel assembly, and a microphone-support system including it, which incorporates a quick-disconnect feature that enables separation of the microphone holding unit from the supporting stand, and ready replacement thereof in any of a number of fixed, angular orientations with respect to the axis of the post. The invention also provides an assembly wherein the removable holder unit includes a pivotably attached stem portion, which can be adjusted to extend at an angle generally perpendicular to the axis of the channel through the socket portion so as to permit convenient hand-held support of a microphone from below. In addition, the invention provides such an assembly which is of relatively uncomplicated, inexpensive and yet durable construction, and it incorporates positive locking features for good positional control.

Having thus described the invention, what is claimed is:

1. An assembly for releasably interconnecting separate components, comprising: a first part having retaining means thereon and an elongated portion projecting from one end thereof, said elogonated portion having a regular, noncircular cross section, in a plane perpendicular to its longitudinal axis, configured to provide a plurality of engagement elements, each extending generally longitudinally along its surface from the outer end thereof; and a second part having a recess therein and having engaging and locking means thereon, said recess being adapted to seat said projecting portion of said first part inserted coaxially thereinto, said engaging means being configured to interengage with said engagement elements in each of a plurality of relative angular positions of said projecting portion within said recess, to prevent rotation of said parts about said axis in each of a plurality of orientations, said assembly having means, including said locking means, for maintaining said parts against disassembly in both axial directions, said locking means being manually operable to releasably engage said retaining means of said first part to retain it in assembly with said second part against disengagement in at least the outward axial direction, with said projecting portion of said first part seated within said recess of said second part, whereby said first and second parts may be joined to separate components to enable the components to be releasably interconnected.

2. The assembly of claim 1 wherein said engaging means of said second part comprises an inside surface defining said recess thereof.

3. The assembly of claim 2 wherein said projecting portion of said first part is a splined post comprised of rectilinear spline elements.

4. The assembly of claim 3 wherein said recess-defining surface of said second part is configured to provide inwardly extending splines mated with the spline elements of said post.

5. The assembly of claim 1 wherein said projecting portion of said first part has an indentation at a location spaced from said outer end to provide said retaining means thereon, and wherein said locking means comprises a locking member that is movably mounted on said second part and that has an edge portion disposed to seat within said indentation of said projecting portion, said locking member thereby serving to prevent disengagement of said parts in both axial directions.

6. The assembly of claim 5 wherein said indentation comprises a circumferential groove, and wherein said locking member is of blade-like form and is slidable along a plane transverse to the axis of said recess to shift said edge portion between a locking position, within said recess, and a release position displaced therefrom.

7. The assembly of claim 6 wherein said locking member is mounted within a slot formed transversely of said axis in said second part and configured to constrain said member to rectilinear shifting movement, and wherein said locking means includes a push button operatively connected to said locking member and externally accessible for manual actuation on said second part, and means for biasing said member to said locking position of said edge portion thereof.

8. The assembly of claim 7 wherein said second part is an elongated collar having a cross section that is of generally circular configuration but asymmetrically enlarged to provide a generally right-angular corner formation, one face of said corner formation having a cavity therein seating said push button of said locking means.

9. The assembly of claim 8 wherein said recess extends longitudinally from one end of said collar, and wherein said collar has a coaxial bore extending inwardly from the opposite end thereof, said bore having a threaded surface to permit said collar to be engaged upon a threaded end portion of a supporting stand.

10. The assembly of claim 1 wherein said first part is a coupling piece having means thereon for attachment to a microphone holder.

11. The assembly of claim 10 wherein said attachment means comprises a threaded lug extending coaxially with said elongated portion and in the opposite direction.

12. A microphone-support system, including: a microphone holder having a first part thereon, and a floor stand having a second part thereon disengageably assembled with said first part, said first part having retaining means thereon and an elongated portion projecting from one end thereof, said elongated portion having a regular, noncircular cross section, in a plane perpendicular to its longitudinal axis, configured to provide a plurality of engagement elements, each extending generally longitudinally along its surface from the outer end thereof; said second part having a recess therein and having engaging and locking means thereon, said recess being adapted to seat said projecting portion of said first part inserted coaxially thereinto, said engaging means being configured to interengage with said engagement elements in each of a plurality of relative angular positions of said projecting portion within said recess to prevent relative rotation of said parts about said axis in each of a plurality of orientations, said assembly having means, including said locking means, for maintaining said parts against disassembly in both axial directions, said locking means being manually operable to releasably engage said retaining means of said first part to retain it in assembly with said second part against disengagement in at least the outward axial direction, with said projecting portion of said first part seated within said recess of said second part.

13. The system of claim 12 wherein said projecting portion of said first part is a splined post having rectilinear spline elements thereon, and wherein said engaging means of said second part comprises an inside surface defining said recess thereof, said recess-defining surface being configured to provide inwardly extending splines mated with the spline elements of said post.

14. The system of claim 12 wherein said projecting portion of said first part has an indentation at a location spaced from said outer end to provide said retaining means thereon, and wherein said locking means comprises a locking member that is movably mounted on said second part and that has an edge portion disposed to seat within said indentation of said projecting portion, said locking member thereby serving to prevent disengagement of said parts in both axial directions.

15. The system of claim 14 wherein said indentation comprises a circumferential groove, and wherein said locking member is of blade-like form and is slidable along a plane perpendicular to the axis of said recess to shift said edge portion between a locking position, within said recess, and a release position displaced therefrom.

16. The system of claim 15 wherein said locking member is mounted within a slot formed perpendicularly of said axis in said second part and configured to constrain said member to rectilinear shifting movement, and wherein said locking means includes a push button operatively connected to said locking member and externally accessible for manual actuation on said second part, and means for biasing said member to said locking position of said edge portion thereof.

17. The system of claim 13 wherein said stand includes a floor-engaging base and a normally upright post thereon, and wherein said second part is removably mounted upon the upper end of said post.

18. The system of claim 12 wherein said microphone holder includes a sleeve member providing a generally rectilinear socket portion for seating an elongated microphone body, said first part being joined to said sleeve member to extend generally perpendicularly therefrom to enable it to function as a handle for the seated microphone.

19. The system of claim 18 wherein said first part is pivotably joined to said sleeve member for movement through an arc of about 180° with respect to and in the plane of the axis of said socket portion.

20. The system of claim 18 wherein said first part is a coupling piece that is separable from said sleeve member and that has means thereon for attachment to another portion of said holder.

21. An assembly for use in nonrotatably interengaging components, comprising: a first part having an elongated portion projecting from one end, said elongated portion having a regular, noncircular cross section, in a plane perpendicular to its longitudinal axis, configured to provide a plurality of engagement elements, each extending generally longitudinally along its surface from the outer end thereof, and having an indentation spaced from said outer end; and a second part having a recess therein and having engaging means thereon, said recess being adapted to seat said projecting portion of said first part inserted coaxially thereinto, and said engaging means being configured to interengage with said engagement elements in each of a plurality of relative angular positions of said projecting portion within said recess, to prevent relative rotation of said parts about said axis in each of a plurality of orientations, said second part also having a locking member movably mounted thereon and manually operable to releasably engage in said indentation of said elongated portion, said locking member having an edge portion dimensioned, configured and disposed to seat within said indentation to retain said first part in assembly with said second part, with said projecting portion within said recess thereof, to prevent disengagement of said parts in both axial directions.

22. The assembly of claim 21 wherein said locking member is mounted to move perpendicularly of the axis of said recess in said second part between positions inwardly and outwardly thereof, wherein a push button is operatively connected to said locking member and is externally accessible for manual actuation on said second part, and wherein means is provided for biasing said locking member to said outwardly position, said edge portion of said locking member being spaced from said push button to the opposite side of said recess in said second part, and engaging said indentation of said elongated portion of said first part in said outwardly position.

23. The assembly of claim 22 wherein said engaging means of said second part comprises an inside surface defining said recess thereof, wherein said indentation comprises a circumferential groove extending entirely about said elongated portion, and wherein said locking member is of blade-like form and is slidable along a plane perpendicular to said axis of said recess to shift said edge portion between a locking position, within said recess, and a release position displaced therefrom.

* * * * *